T. J. NASH.
STRAINER ATTACHMENT FOR COOKING UTENSILS.
APPLICATION FILED MAR. 16, 1914.
1,130,756.
Patented Mar. 9, 1915.
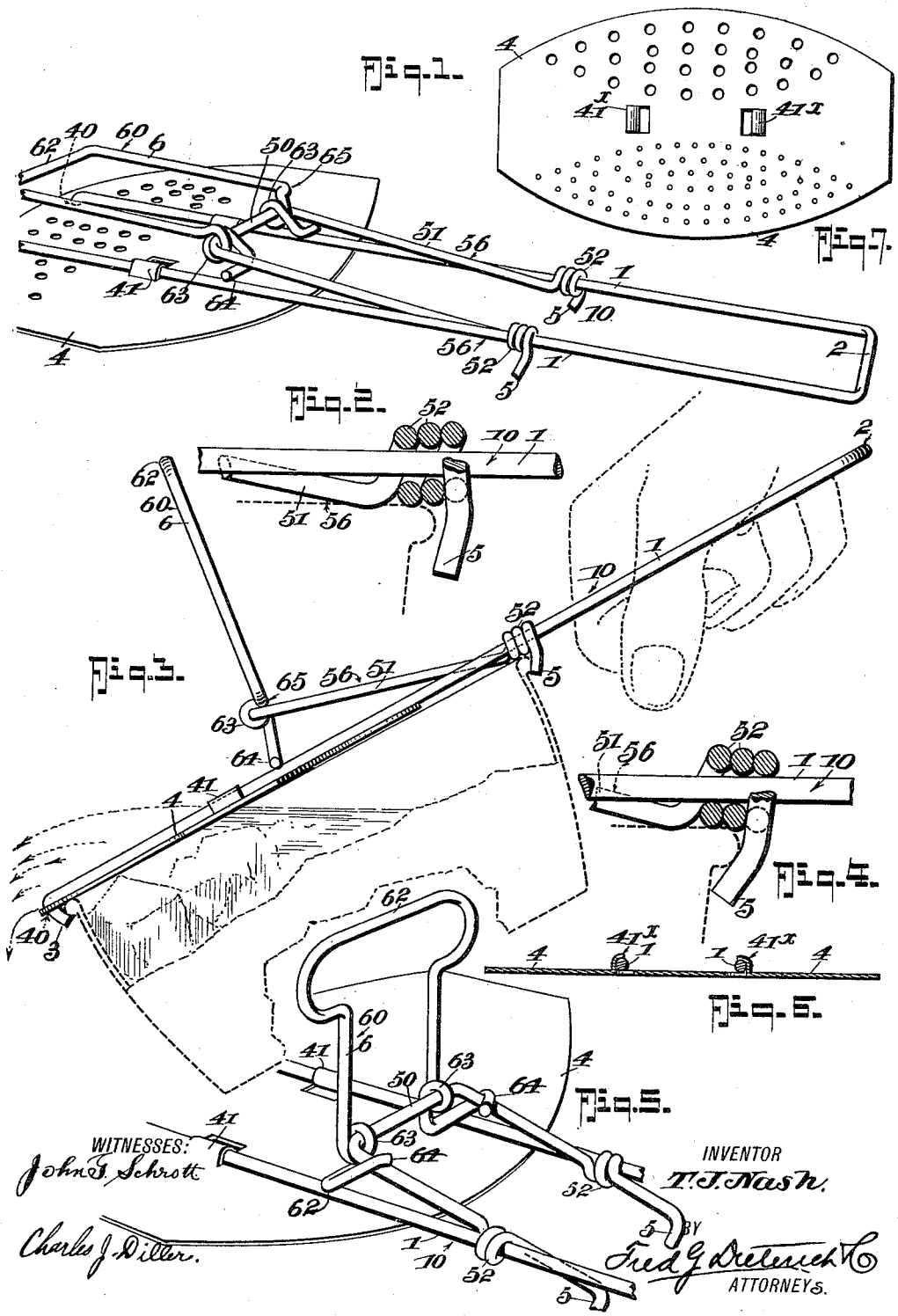
WITNESSES:
John J. Schrott
Charles J. Diller
INVENTOR
T. J. Nash,
BY
Fred G. Dieterich
ATTORNEYS.

UNITED STATES PATENT OFFICE.

THOMAS J. NASH, OF LINCOLN, NEBRASKA.

STRAINER ATTACHMENT FOR COOKING UTENSILS.

1,130,756. Specification of Letters Patent. Patented Mar. 9, 1915.

Application filed March 16, 1914. Serial No. 824,980.

*To all whom it may concern:*

Be it known that I, THOMAS J. NASH, residing at Lincoln, in the county of Lancaster and State of Nebraska, have invented a new and Improved Strainer Attachment for Cooking Utensils, of which the following is a specification.

This invention is in the nature of an attachment or device, in which is included a straining member and a means for quickly and positively attaching it to the top of any of the ordinary kinds of kettles, stew pans and like cooking utensils for straining or drawing off the liquid contents from the said utensils.

The primary object of my invention is to provide an attachment of the character stated of a simple and economical construction, and which is especially designed for being clamped to the top of the kettle or like vessel with the straining element so held whereby to conveniently strain fruit juices, lard, etc., as well as draining off the water from potatoes or other vegetables, or other articles of food that require straining when cooking the same.

Another object of my invention is to provide a device for the purpose stated in which is included a peculiar arrangement of members, which, while forming a coöperative part of the means for attaching my device to the kettle or pot, also serve as handles for conveniently carrying or handling the kettle or pot with the hot contents and in such a manner that the hands do not come into contact with the cooking utensil or the bail thereof and the hands caused to remain well up out of the way of the hot water vapor or steam, etc., that discharges from the said utensil and also to thereby render the use of cloths, as is generally required, unnecessary.

Again, my invention seeks to provide an improved attachment of the character stated in which is included gripping means that operate for instantly connecting the attachment to or detaching it from the utensil and which when set to its gripped position positively avoids the possibility of dropping the hot utensil.

With other objects in view that will hereinafter appear, my invention embodies the peculiar construction and novel arrangement of the parts hereinafter first described in detail, specifically pointed out in the appended claims, and illustrated in the accompanying drawing, in which:

Figure 1 is a perspective view of the attachment, the parts being shown at their normal position. Fig. 2 is an enlarged detail section of the receptacle engaging hook in the position as indicated in Fig. 1. Fig. 3 is a side elevation of the attachment, the same being shown as in use. Fig. 4 is an enlarged section of the receptacle engaging hook when the parts are positioned as in Fig. 3. Fig. 5 is a somewhat modified form of my attachment hereinafter referred to. Figs. 6 and 7 are a sectional and a plan view respectively of a further modification hereinafter to be described.

In the practical construction and the preferred form of my attachment, the same embodies a main or body portion 10, bent up from a single strand of stout spring wire and consisting of the two parallel side members 1—1, the outer or cross member 2, and the front downwardly and inwardly bent hooks 3—3, to which the strainer plate 4 of sheet metal is attached, the said plate having a pair of apertures 40 near its front edge through which the inwardly bent hooks 3—3 pass, and for securely holding the strainer upon the said side members 1, the plate 4 is cut to form portions 41, that are bent over the members 1—1 and serve as fastening clips, as shown.

The strainer plate has its front edge curved so as to snugly fit over the outer rim edge of the pot to which it may be applied, and it is fixedly held in position by the hooks 3—3 that grip over the outer edge of the pot, kettle or pan, and a pair of adjustable hooks or fingers 5—5, pendent from the side members 1—1 upon which they are slidably mounted.

By now referring more particularly to Fig. 1 of the drawing, it will be noticed the hooks 5—5 are the bent ends of a sliding frame 56 composed of a single strand of stout spring wire which includes a cross member 50 and side arms 51 that terminate in coil loops 52, the ends of which terminate in the hooks 5—5 before mentioned.

The loops 52 slidably engage the side members 1—1 of the main or body frame, it being apparent from the drawing, that since the hooks and the members of which they form a part, are slidably mounted, with respect to the main or body portion, the said hooks 5 can be moved to or from the fixedly held hooks 3—3 to suit the diameter of the rim edge of the pot or kettle to which the attachment is to be applied, it being also obvious that as the two sets of hooks 3 and 5 bend inwardly, that when locked in position, in the manner to be presently explained, the pot or other utensil, to which my attachment may be applied, can be readily lifted with my attachment, without danger of becoming disconnected therefrom. For locking the hooks 5 in their engagement with the utensil, a second handle member 60 is provided that is also bent to shape from a single strand of stout spring wire, and the same consists of the side arms 6 and the top or cross member 62.

The handle member 60 is swingably mounted upon the cross bar of the member 50 of the slidable frame and at the pivotal portion thereof, the said side arms 6 are first bent inwardly at right angles, to form, lever-like bearings and then bent into loops 63 that fit over the cross member 50 of the sliding frame, and then bent downwardly and outwardly to form crank-like ends, the members 64 of which engage the side members 1 of the main frame or body, and form, as it were, locking cams that cause the spring side arms 51 to bend up under tension and thereby cause the loops 52 to firmly grip the side members 1, and thus hold the hooks 5—5 locked to their adjusted position.

By reason of the peculiar construction and the novel arrangement of my attachment, as described, the movable frame carrying the hooks 5—5 can be readily drawn along the main members 1, when the handle frame 6 is down to the position shown in Fig. 1, and since the side arms of the slidable frame incline downwardly and terminate at a point slightly below the loops 52 (see Fig. 4) when pulling the said frame to bring the hooks 5—5 up against the edge of the utensil, the loops 52 will be kept from catching against the edge of the utensil and caused to freely ride over the said edge. Again, the crank ends of the handle frame 6 are so formed, relatively to the pivot loops of the said frame, when the handle frame is swung up to the vertical position, (see Fig. 3) that the crank or locking members engage with the side arms 1—1 at a point slightly in advance of the center of the loops to thereby hold the handle frame to the vertical position, and the frame having the hooks 5—5, up under spring tension, to thereby lock the slidable and the handle frames to their said adjusted position until the handle frame is pushed down to the horizontal position, by the user.

Since the outer end of the main or body frame forms a handle, it will be readily apparent that the operator can readily use the two hands for tipping the pot for draining or for lifting the pot with its contents from place to place, without danger of burning or scorching the hands and without the necessity of handling the cooking utensil proper.

In Fig. 5, I have shown a slightly modified form of my invention. In this form the same general characteristics of the other form are found, the difference being that the hooks 5—5 are formed some distance from the loops 52 and the bearing portions 62 engage the main frame side arms 1, while the crank members 64 engage the side arms of the sliding frame, being, as it were, a reversal of the said parts as shown in Figs. 1 to 4.

Figs. 6 and 7 are respectively a sectional and a plan view of a further modification in which lugs 41$^x$ are stamped from the strainer body, but instead of clamping them around the rods 1, as is shown in Fig. 1, the said lugs are so formed as to permit the rods to be sprung into place, this feature being desirous since the plate 4 is provided with two sets of strainer apertures, as is shown in Fig. 7, and must therefore be made reversible.

What I claim is:

1. An appliance of the character stated, comprising a main or body frame, including side members whose outer ends terminate in hooks for engaging over one edge of a cooking utensil, a second frame of spring wire bent to form a cross member and side arms, the latter having loops that slidably engage the side members of the main frame and whose ends terminate in hooks for engaging the other edge of the cooking utensil and a third frame pivotally mounted on the cross member of the second frame to fold flatwise with respect to the said second frame and the main frame, the said third frame having cam-like extensions for engaging the side arms of the main and the second frames, whereby, when the said third frame is swung up, tension is applied to the side arms of the second frame for causing its loops to frictionally bind upon the side arms of the main frame, and a strainer plate secured flatwise upon the outer ends of the side arms of the main frame.

2. As a new article of manufacture, an appliance for holding cooking utensils that embodies a main or body frame of spring wire and which includes a cross member and side arms, the ends of the latter being bent down to form hooks for engaging one edge of a cooking utensil, a U-shaped spring wire frame having its side arms coiled to form loops for slidably engaging the side arms of the main frame and having the ends of its side arms bent to form hooks for engaging the opposite edge of the cooking utensil, a third U-shaped frame formed of spring wire whose side arms have bent portions for engaging the upper side of the side arms of the slidable frame, said portions terminating with loops that pivotally engage the cross member of the slidable frame, said loops terminating in crank-like extensions including outwardly projected members that engage the upper face of the side arms of the main frame and so arranged relatively to the main and the sliding frame whereby when the U-shaped frame is swung to the vertical position, tension is applied to the U-shaped frame to cause its loops to become frictionally locked upon the side arms of the main frame.

3. As a new article of manufacture, an appliance for holding cooking utensils that embodies a main or body frame of spring wire and which includes a cross member and side arms, the ends of the latter being bent down to form hooks for engaging one edge of a cooking utensil, a U-shaped spring wire frame having its side arms coiled to form loops for slidably engaging the side arms of the main frame and having the ends of its side arms bent to form hooks for engaging the opposite edge of the cooking utensil, a third U-shaped frame formed of spring wire whose side arms have bent portions for engaging the upper side of the side arms of the slidable frame, said portions terminating with loops that pivotally engage the cross member of the slidable frame, said loops terminating in crank-like extensions including outwardly projected members that engage the upper face of the side arms of the main frame and so arranged relatively to the main and the sliding frame whereby when the U-shaped frame is swung to the vertical position tension is applied to the U-shaped frame to cause its loops to become frictionally locked upon the side arms of the main frame, and a straining plate secured flatwise upon the outer ends of the side arms of the main frame, and means on the plate for holding it fixedly connected with the said side arms.

4. As a new article, an attachment adapted for suspending cooking vessels comprising a main frame formed of stout wire, and including a cross or end member and side arms, the outer ends of which are bent down to form hooks for engaging with one side of the utensil edge, a U-shaped frame bent up from a single strand of spring wire, said frame including loop coils for slidably engaging with the side arms of the main frame, the lower end of the said side arms being at a plane below the coils, said coils terminating in pendent hook members for engaging the other edge of the cooking utensil, a third U-shaped frame whose side arms are bent to form loops that take around the cross member of the slidable U-shaped frame, said side arms also including right angled extensions for riding upon the upper ends of the slidable member, the loop of the pivotally mounted frame and crank portions at a point below the pivotal loop, a strainer device mounted upon the outer ends of the main frame and means for fixedly holding it in position.

THOMAS J. NASH.

Witnesses:
LEO J. SCHMITTEL,
C. W. MOSELEY.